United States Patent [19]

Angelo

[11] Patent Number: 5,560,673
[45] Date of Patent: Oct. 1, 1996

[54] TRUCK CAB AND SLEEPER ASSEMBLY

[75] Inventor: Gerald J. Angelo, Redmond, Wash.

[73] Assignee: PACCAR Inc., Bellevue, Wash.

[21] Appl. No.: 191,097

[22] Filed: Feb. 4, 1994

[51] Int. Cl.⁶ .................................................. B60P 3/32
[52] U.S. Cl. ...................... 296/190; 296/166; 180/89.12
[58] Field of Search .................................. 296/190, 164, 296/166, 167; 180/89.12

[56] References Cited

U.S. PATENT DOCUMENTS

| | | |
|---|---|---|
| 3,055,699 | 9/1962 | May .................................... 296/190 |
| 3,067,437 | 12/1962 | Campbell .............................. 5/118 |
| 3,141,178 | 7/1964 | Campbell .............................. 5/118 |
| 3,231,304 | 1/1966 | Coup .................................. 296/24.1 |
| 3,402,960 | 9/1968 | Erke .................................... 296/174 |
| 3,420,566 | 1/1969 | Obra .................................... 296/166 |
| 3,524,673 | 8/1970 | Cramer et al. ........................ 296/156 |
| 3,586,119 | 6/1971 | Chuchua et al. ..................... 180/14.1 |
| 3,588,168 | 6/1971 | Froitzheim et al. ................... 296/190 |
| 3,612,599 | 10/1971 | Sternberg ............................ 296/24.1 |
| 3,625,560 | 12/1971 | Bjork .................................. 296/166 |
| 3,637,251 | 1/1972 | Plant, Jr. ............................. 296/166 |
| 3,638,991 | 2/1972 | Hathaway, Jr. ...................... 296/166 |
| 3,729,224 | 4/1973 | Hathaway, Jr. ...................... 296/166 |
| 3,843,189 | 10/1974 | Duff et al. ........................... 296/166 |
| 3,879,081 | 4/1975 | Hockley et al. ...................... 296/190 |
| 3,900,224 | 8/1975 | Copeland ............................. 296/166 |
| 3,937,516 | 2/1976 | Chapman ............................. 296/166 |
| 4,093,301 | 6/1978 | Kwok .................................. 296/166 |
| 4,095,836 | 6/1978 | Pettit ................................... 296/166 |
| 4,108,487 | 8/1978 | Spohn ................................. 296/190 |
| 4,121,684 | 10/1978 | Stehpens et al. .................... 180/89.14 |
| 4,157,201 | 6/1979 | Collins et al. ........................ 296/166 |
| 4,183,573 | 1/1980 | DeRidder ............................. 296/166 |
| 4,201,415 | 5/1980 | Suchanek ............................ 296/190 |
| 4,215,899 | 8/1980 | Schmidt et al. ...................... 296/190 |
| 4,226,466 | 10/1980 | Moll et al. ............................ 296/190 |
| 4,351,554 | 9/1982 | Miller .................................. 296/24.1 |
| 4,364,599 | 12/1982 | Moll et al. ............................ 296/190 |
| 4,378,856 | 4/1983 | Miller .................................. 180/89.14 |
| 4,436,177 | 3/1984 | Elliston ............................... 180/324 |
| 4,492,384 | 1/1985 | Herschelman ....................... 296/166 |
| 4,511,175 | 4/1985 | Gellenbeck .......................... 296/190 |
| 4,627,655 | 12/1986 | Collins ................................ 296/166 |
| 4,659,137 | 4/1987 | Chassaing et al. ................... 296/190 |
| 4,775,179 | 10/1988 | Riggs .................................. 296/180.2 |
| 4,813,736 | 3/1989 | Schubert et al. ..................... 296/190 |
| 4,848,831 | 7/1989 | Buday ................................. 296/166.7 |
| 4,913,485 | 4/1990 | Moffatt et al. ........................ 296/190 |
| 4,940,278 | 7/1990 | LePere ................................ 296/166 |
| 5,004,293 | 4/1991 | Thomas .............................. 296/166 |
| 5,067,769 | 11/1991 | Benchoff ............................. 296/166 |
| 5,083,834 | 1/1992 | Moffatt et al. ........................ 296/190 |
| 5,108,144 | 4/1992 | Crowley .............................. 296/167 X |
| 5,310,239 | 5/1994 | Koske et al. ......................... 296/190 |

FOREIGN PATENT DOCUMENTS

| | | | |
|---|---|---|---|
| 2838150 | 3/1980 | Germany .................. B62D 33/06 |
| 59-11932 | 1/1984 | Japan . | |
| 2166094 | 4/1986 | United Kingdom .................. 296/190 |

OTHER PUBLICATIONS

"Kenworth W900B—The World's Best" brochure; 16 pages; Revised Jul. 1985.
"Kenworth T600B" brochure; 8 pages.
"CL Series: The High–Powered Conventional From Mack" brochure; 19 pages; 1992.
"CH600: The High Performance Highway Conventional" Mack Truck brochure; 11 pages; 1992.
"Development of Mack Trucks' CH600 Conventional Vehicle"; S. F. Homcha, M. H. Kohler and M. P. Merkel; *SAE Technical Paper Series;* Mack Trucks, Inc., Allentown, PA; Nov. 1989; pp. 1–12.

*Primary Examiner*—Joseph D. Pape
*Attorney, Agent, or Firm*—Seed and Berry LLP

[57] ABSTRACT

A truck cab and sleeper assembly is shown and described. In a preferred embodiment, a cab having no rear wall and a sleeper having no front wall are coupled together via bolts and a compressive seal. An internal rain gutter and an adhesive sealant are further provided to seal the interface between the cab and sleeper against moisture. The cab and sleeper may therefore be easily separated by cutting the adhesive sealant and unbolting the two structures. Because there are no walls between the cab and sleeper, access between the two is substantially unrestricted. The roof of both the cab and the sleeper slope upward in a rearward direction, thereby providing sufficient head room, together with the unrestricted access, to allow an occupant of the truck to comfortably transition frown a seated position in the cab to a standing position in the sleeper, and vice versa.

11 Claims, 5 Drawing Sheets

5,560,673

TRUCK CAB AND SLEEPER ASSEMBLY

TECHNICAL FIELD

This invention relates to cab and sleeper assemblies for trucks, and more particularly, to an apparatus and method for coupling a cab to a sleeper.

BACKGROUND OF THE INVENTION

Currently available truck cab and sleeper assemblies may be categorized as being either "modular" or "integral." Modular assemblies consist of separate cab and sleeper structures that are individually mounted to a truck chassis or a common subframe. Access between the cab and sleeper is provided through an opening in a back wall of the cab and a front wall of the sleeper, the openings being connected and sealed against moisture by a flexible "boot." Although the modular assembly has the advantage of allowing the sleeper to easily be removed or replaced, the connecting tunnel between the cab and sleeper provides relatively restricted access.

Integral assemblies provide a cab and sleeper in a single structure, thereby providing unrestricted access between the cab and sleeper. However, because the cab and sleeper are provided in a single structure, it is impossible to remove or replace the sleeper.

Applicant therefore believes that it would be possible and beneficial to provide an improved cab and sleeper assembly.

SUMMARY OF THE INVENTION

It is therefore an object of this invention to provide an improved truck cab and sleeper assembly.

It is another object of this invention to provide a truck cab and sleeper assembly that allows unlimited access between the cab and sleeper, while allowing the sleeper to be easily removed or replaced.

These and other objects of the invention, as will be apparent herein, are accomplished by providing an improved truck cab and sleeper assembly wherein a truck cab having no rear wall is coupled to a sleeper having no front wall. Access between the cab and sleeper is therefore substantially unrestricted. In a preferred embodiment, a gasket such as foam rubber is provided between the cab and sleeper, and the cab and sleeper are bolted together, thereby creating a compression seal between the two members. An adhesive sealant is provided to an exterior surface of the gasket, thereby further sealing an interface between the cab and sleeper against moisture. The sleeper may therefore easily be removed by cutting the adhesive and unbolting the sleeper from the cab. If the cab is to be used by itself, a rear cab closure assembly may be coupled to the rear of the cab in place of the sleeper.

To further prevent moisture from entering the cab or sleeper, a leading edge of the sleeper is curved to form an internal gutter below an internal surface of the gasket such that any moisture that leaks past the adhesive seal and gasket will be caught and channeled away from the interface between the cab and the sleeper by the gutter.

In a preferred embodiment, both the cab and the sleeper roof slope upward in a rearward direction, thereby providing sufficient head room to allow a passenger or a driver to comfortably transition from a seating position in the cab to a standing position in the sleeper, and vice versa.

DETAILED DESCRIPTION OF THE INVENTION

Figure 1:
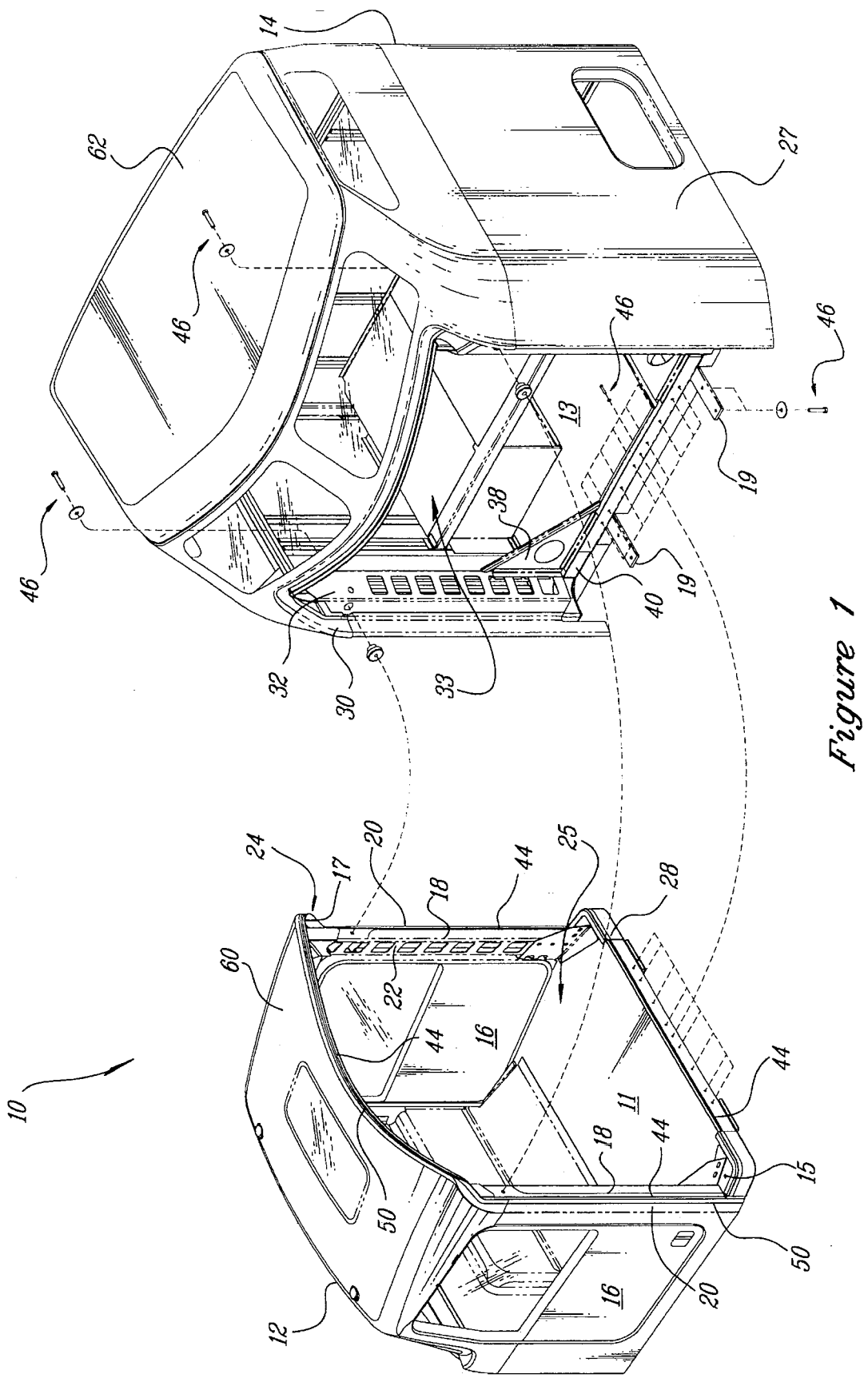
FIG. 1 is an exploded isometric view of a cab and sleeper assembly illustrating a preferred embodiment of the present invention.

FIG. 1 illustrates an exploded view of a cab and sleeper assembly 10 provided in accordance with a preferred embodiment of the present invention. A cab 12 having no rear wall and a sleeper 14 having no front wall are coupled together such that access between the cab 12 and the sleeper 14 is substantially unrestricted, and the sleeper 14 may be easily removed and reattached to the cab 12. In a preferred embodiment, cab 12 and sleeper 14 are mounted on the vehicle main chassis frame (not shown), and an air suspension is provided at the rear of the sleeper. If cab 12 is used without sleeper 14, as will be discussed in greater detail below, the suspension is moved forward to be positioned under cab 12.

Figure 2:
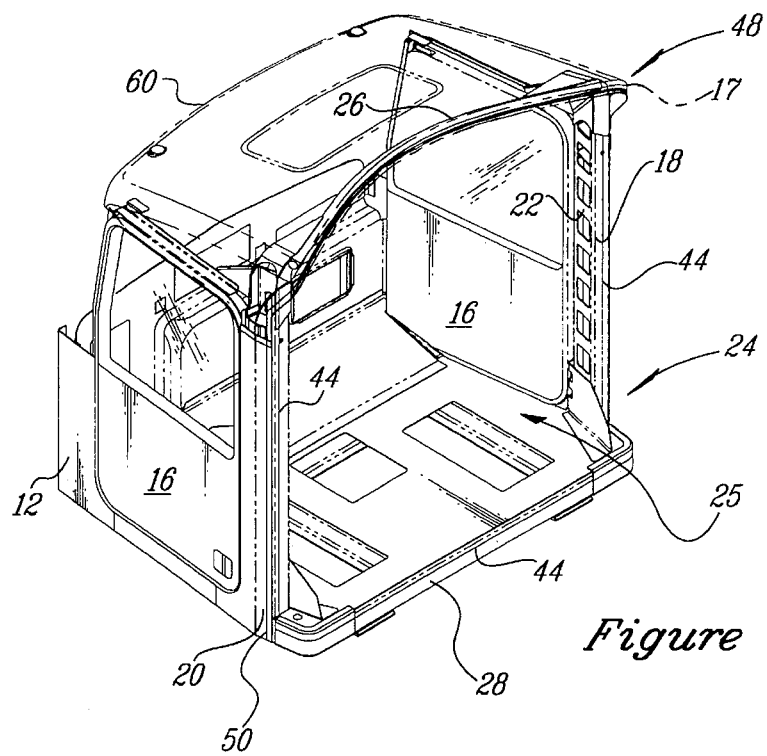
FIG. 2 is a rear isometric view of the cab structure of FIG. 1.

More particularly, the cab 12 is provided with a floor 11 and with two sidewalls 16 that extend longitudinally rearward, the trailing edges of the sidewalls forming pillars 18. The pillars 18 are reinforced and coupled to each other by cab upper cross-member 26 provided under cab roof 60, as best seen in FIG. 2. Reinforced pillars 18 and cab upper cross-member 26, together with cab floor 11, thereby hold a rear region 28 of the cab 12 square, thereby eliminating a need for a rear wall. A rear opening 25 in cab 12 is therefore defined by the trailing edges of the sidewalls 16, cab floor 11 and cab roof 60.

Figure 3:
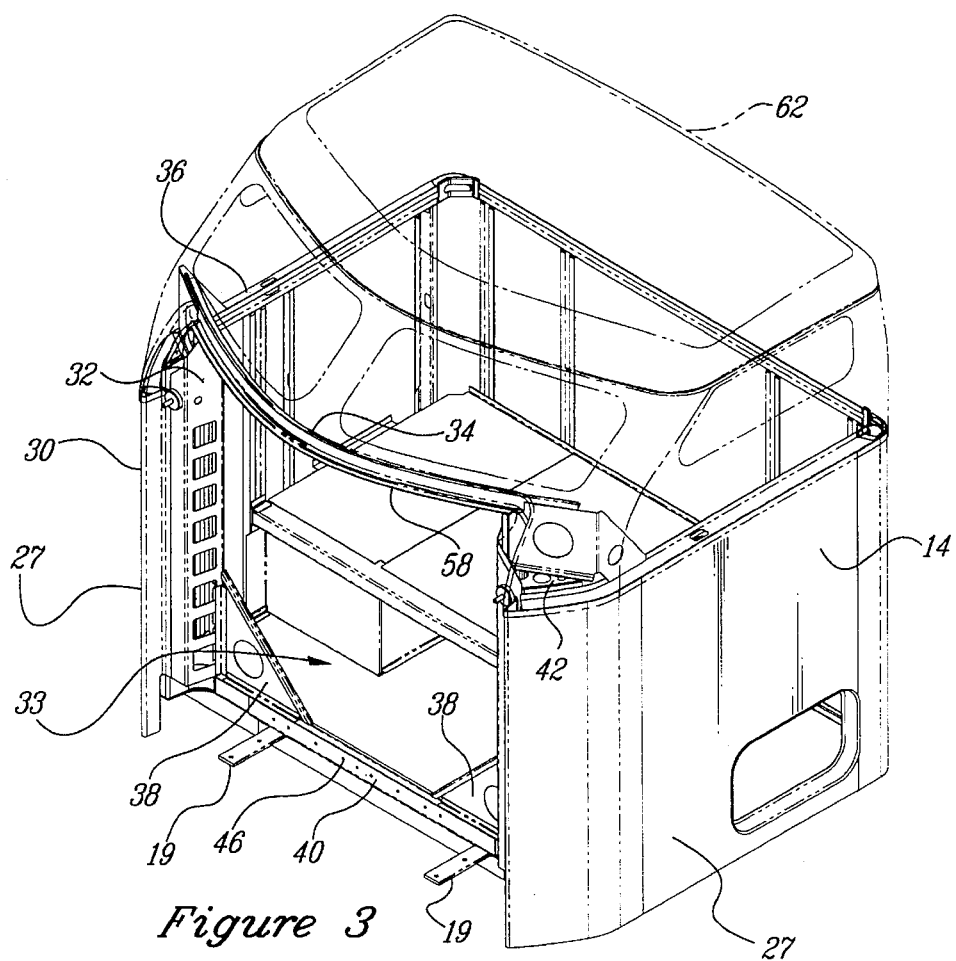
FIG. 3 is a front isometric view of the sleeper structure of FIG. 1.

Similarly, as illustrated in FIGS. 1 and 3, the sleeper 14 is provided with a floor 13, a sleeper upper front cross-member 34, and with two sleeper sidewalls 27 having leading edges that form front outer panels 30 that extend longitudinally forward to engage an outer surface 20 of pillars 18, respectively. The sleeper 14 is further provided with two front inner panels 32 that engage an inner surface 22 of pillars 18, respectively. In a preferred embodiment, pillars 18 taper in a rearward direction such that the front outer panels 30 engage pillars 18 to form integral width transition fairings. Reinforcing gussets 38 couple the front inner panels 32 to a sleeper front floor sill 40 and serve to transmit body twist forces into the floor structure. Sleeper sidewalls 27 and sleeper upper cross-member 34, together with sleeper floor 13, thereby hold a forward region of the sleeper 14 square, thereby eliminating the need for a front wall. A forward opening 33 in sleeper 14 is thereby defined by the leading edges of the sleeper sidewalls 27, the sleeper roof 62 and the sleeper floor 13. The upper end of inner panels 32 are coupled to sleeper upper side sills; 36 by reinforced sill bushing brackets 42 which also serve to interconnect the cab 12 and sleeper 14, as will be discussed in greater detail below.

The cab and sleeper are coupled together by providing a gasket, for example, of foam rubber or the like, to the rear 24 of the cab 12. Specifically, a sponge rubber gasket having a backing of pressure-sensitive adhesive is positioned along cab rear floor sill 28, and a bulb seal or tubular sponge seal having a u-shaped cross section to engage a flange is provided along that rear surface of pillars 18 and along a flange 17 provided at a rear surface of the cab roof 60. It will be understood that the gasket could be provided on the sleeper as an alternative to providing it on the cab. The cab 12 and sleeper 14 are then bolted together through flanges 19 and through the cab rear floor sill 28 and sleeper front floor sill 40 at the locations illustrated at reference numerals 46. A bolt 46 is further provided on either side of the cab and sleeper assembly 10 between the sleeper front inner panels 32 and pillars 18 of cab 12. By coupling the cab and sleeper in this manner, a compression seal is created at an interface 48 between the cab and sleeper. The interface 48 between the cab and sleeper is further sealed against moisture by applying a polyurethane or similar adhesive sealant 50 to an exterior surface 52 of gasket 44, extending along the sides and top of the interface 48 between the cab and sleeper. The adhesive sealant further serves to distribute stresses throughout the joint or interface area.

Figure 4:
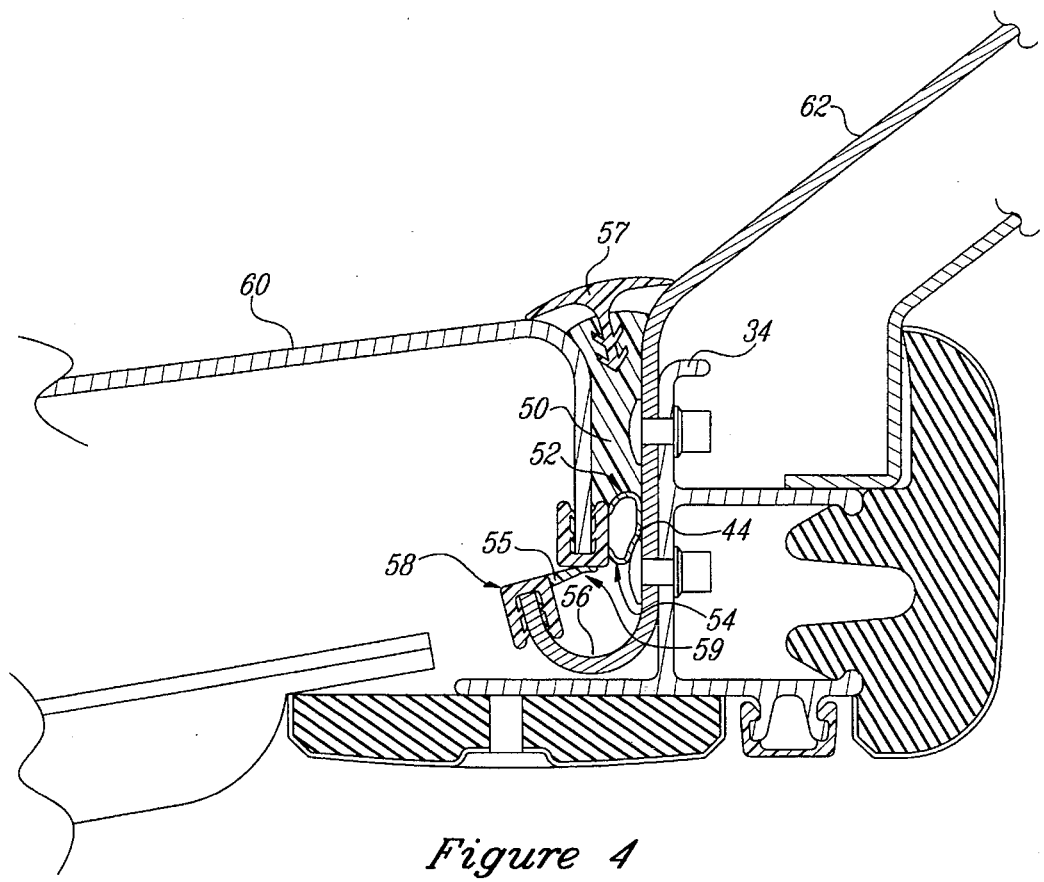
FIG. 4 is a cross-sectional elevational view of an interface between the cab and sleeper structures of FIG. 1, taken along line 4—4 of FIG. 6.

As best seen in FIG. 4, a leading edge 58 of sleeper 14 is formed to provide a gutter 56 below an internal surface 54 of gasket 44. In a preferred embodiment, the leading edge 58 has a "J" cross section, that is reinforced by sleeper upper front cross-member 34. If any moisture penetrates adhesive sealant 50 and gasket 54, it will be collected by gutter 56 and channeled to the sides of interface 48 where it will drain down and be discharged through evacuator valves 15 located in the floor of the cab. A seal 55 is provided to close off an open region 59 of gutter 56, thereby trapping any collected moisture. If desired, a trim piece 57 may be provided along the adhesive sealant 50.

Figure 5:
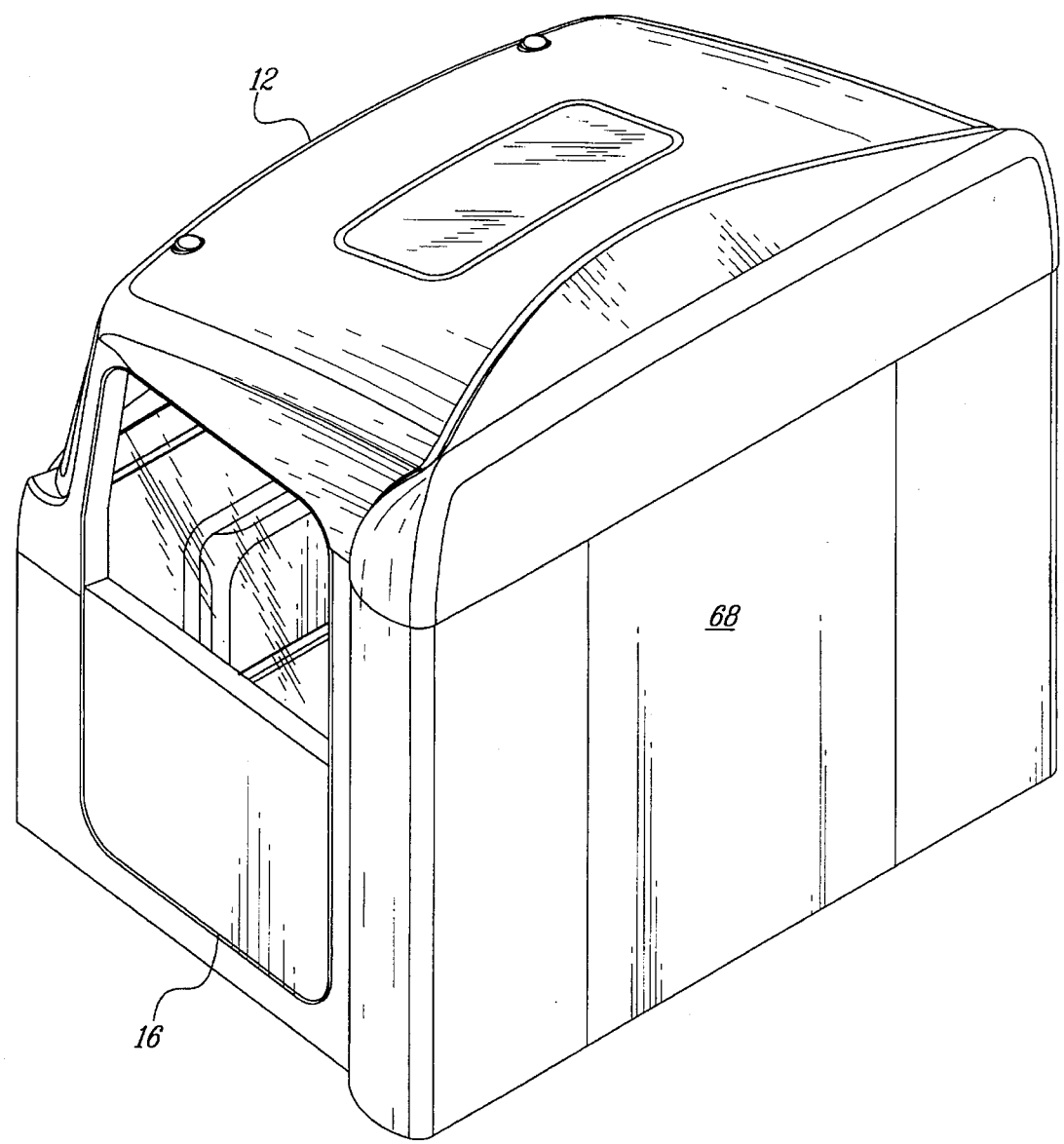
FIG. 5 is a rear isometric view of the cab structure of FIG. 1 coupled to a cab closure assembly.

By providing a cab and sleeper assembly 10 in accordance with a preferred embodiment of the present invention, the sleeper may be easily removed by cutting the adhesive sealant 50 and unbolting the sleeper from the cab. The ease with which the sleeper may be removed may be beneficial in several circumstances, for example, if the sleeper is damaged, it may be removed for repair and a replacement sleeper may be attached to the cab in its place. It may also be desirable to use the cab 12 without a sleeper, which may be accomplished by removing sleeper 14 and coupling a cab closure assembly 68 to the rear of cab 12, as illustrated in FIG. 5. Cab closure assembly 68 may be bolted to cab 12, similar to the manner in which sleeper 14 may be bolted to cab 12.

Figure 6:
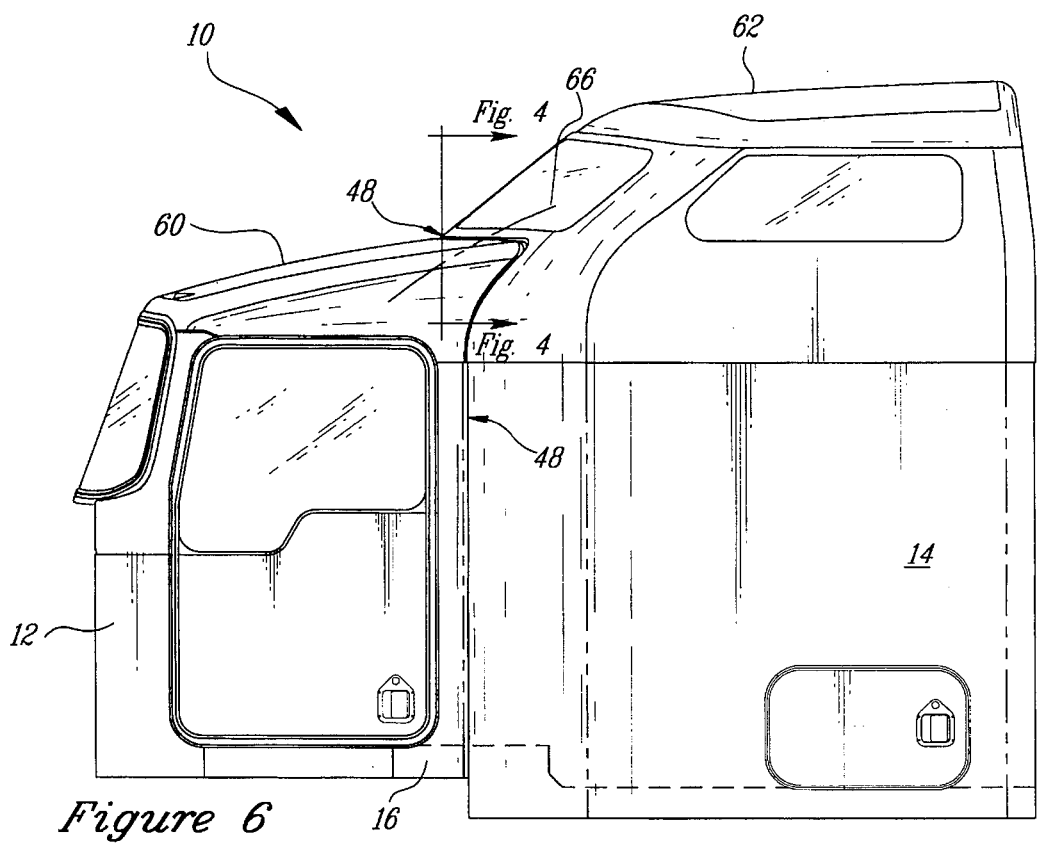
FIG. 6 is a right side elevational view of the cab and sleeper assembly of FIG. 1, in a joined position.

As illustrated in FIG. 6, the cab roof 60 and sleeper roof 62 both slope upward in a rearward direction, thereby allowing sufficient head room such that a person may transition comfortably from a seated position in the cab to a standing position in the sleeper as illustrated by head sweep path 66, and vice versa. The ease of access between the cab and sleeper is further enhanced by the elimination of walls between cab 12 and sleeper 14, and by providing the sleeper floor 13 slightly lower than cab floor 11, for example 5 inches lower. Furthermore, the region between the front outer panels 30 and front inner panels 32 of sleeper 14 may be used for storage space, thereby allowing the seats of the truck to fully recline without suffering a loss of storage space.

Figure 7:
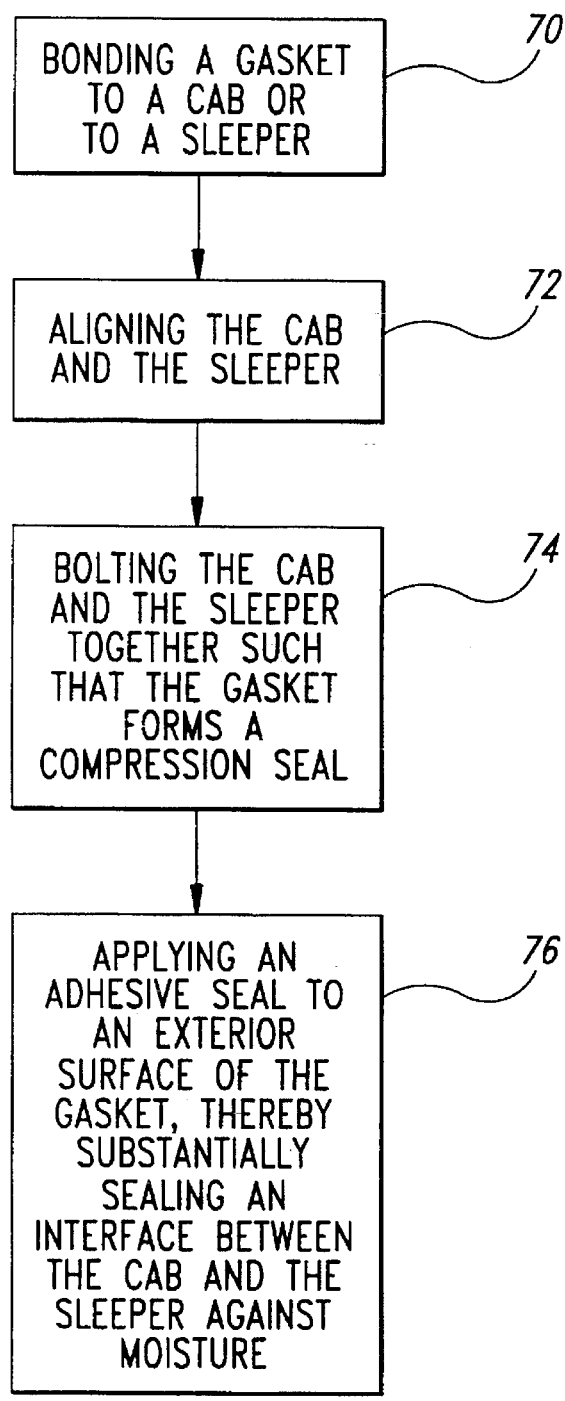
FIG. 7 is a diagram illustrating the steps of a preferred embodiment of the present invention.

As illustrated in FIG. 7, a cab 12 and sleeper 14 may be coupled together in accordance with the preferred embodiment of the present invention by bonding a gasket 44 to cab 12 or sleeper 14, step 70; aligning the cab 12 and sleeper 14, step 72; bolting cab 12 and sleeper 14 together, step 74; and applying an adhesive sealant 50 to an exterior surface 52 of gasket 54, step 76.

An improved truck cab and sleeper assembly has been shown and described. From the foregoing, it will be appreciated that, although embodiments of the invention have been described herein for purposes of illustration, various modifications may be made without deviating from the spirit and scope of the invention. Thus, the present invention is not limited to the embodiments described herein,, but rather as defined by the claims which follow.

I claim:

1. A truck cab and sleeper assembly comprising:

a cab positioned forward of the sleeper, and having no rear wall adjacent the sleeper, the cab being provided with a floor and with two sidewalls that extend longitudinally rearward towards the sleeper to form pillars at a rear of the cab, the pillars being coupled together by a cab upper cross-member, such that the rear of the cab is held square;

a sleeper having no front wall adjacent the cab, the sleeper being provided with a floor, a sleeper upper front cross-member and with two front panels that extend longitudinally forward towards the cab to engage the pillars; and a gasket provided between the floor of the cab and the floor of the sleeper, between the pillars of the cab and the front panels of the sleeper and between the cab upper cross-member and the sleeper upper front cross member, and wherein the cab and the sleeper are bolted together, such that a compression seal is created along an interface between the cab and the sleeper, and access between the cab and the sleeper is substantially unrestricted.

2. The truck cab and sleeper assembly according to claim 1 wherein an adhesive sealant is provided along a full width of an exterior surface of the gasket, thereby substantially sealing the interface between the cab and the sleeper against moisture.

3. The truck cab and sleeper assembly according to claim 2 wherein a gutter is provided below an interior surface of the gasket along the interface between the cab and the sleeper to catch moisture that may leak past the adhesive seal or the gasket and to channel the moisture away from the interface between the cab and the sleeper.

4. The truck cab and sleeper assembly according to claim 1 wherein a gutter is provided between the cab and the sleeper to channel moisture away from an interface between the cab and the sleeper.

5. The truck cab and sleeper assembly according to claim 4 wherein a leading edge of the sleeper is formed to provide the gutter.

6. The truck cab and sleeper assembly according to claim 1 wherein a roof of the cab and a roof of the sleeper both slope upward in a rearward direction to provide sufficient head room such that a person in the cab may comfortably move from a seated position in the cab to a standing position in the sleeper.

7. The truck cab and sleeper assembly according to claim 1, further comprising:

a cab closure assembly, wherein the cab and the sleeper may easily be coupled and uncoupled and wherein the cab closure assembly may be coupled to a rear of the cab when the cab and sleeper are uncoupled, whereby the cab may be used without the sleeper.

8. A truck cab and sleeper assembly comprising:

a cab positioned forward of the sleeper and having two sidewalls that extend longitudinally rearward towards the sleeper to form pillars at a rear of the cab, the pillars being coupled together by a cab upper cross-member;

a sleeper having a sleeper upper front cross-member and two outer front panels that extend longitudinally forward towards the cab to engage an outer surface of the two pillars and two front inner panels that extend longitudinally forward to engage an inner surface of the pillars; and a gasket provided between the cab and the sleeper, the cab and sleeper being coupled such that a compression seal is created at an interface between the cab and the sleeper, and wherein an adhesive sealant is provided along an exterior surface of the gasket and a gutter is provided below an interior surface of the gasket along the interface between the cab and sleeper to catch moisture that may leak past the adhesive seal or the gasket and to channel the moisture away from the interface between the cab and the sleeper.

9. A truck cab and sleeper assembly comprising:

a cab positioned forward of the sleeper and having two sidewalls that extend longitudinally rearward towards the sleeper, the sidewalls each having a trailing edge, a floor provided with a trailing edge, and a roof provided with a trailing edge, the sidewalls, the floor and the roof being coupled together such that the trailing edge of each of the sidewalls, the floor, and the roof form a rear opening in the cab;

a sleeper having two sleeper sidewalls that extend longitudinally forward towards the cab, the sleeper sidewalls each having a leading edge, a sleeper floor provided with a leading edge, and a sleeper roof provided with a leading edge, the sleeper sidewalls, the sleeper floor, and the sleeper roof being coupled together such that the leading edge of each of the sleeper walls, the sleeper floor, and the sleeper roof form a forward opening in the sleeper; and a gasket provided between the rear opening in the cab and the forward opening in the sleeper along a full perimeter of each of the openings, and wherein the cab and the sleeper are coupled together such that access between the cab and the sleeper is substantially unrestricted.

10. A method for coupling a truck cab to a sleeper comprising:

bonding a gasket to a full perimeter of an opening in a rear surface of a cab or to a full perimeter of an opening in a forward surface of a sleeper;

aligning the opening in the cab and the opening in the sleeper;

bolting the cab and the sleeper together such that the gasket forms a compression seal; and applying an adhesive sealant to a full width of an exterior surface of the gasket, thereby substantially sealing an interface between the cab and the sleeper against moisture.

11. A truck cab and sleeper assembly comprising:

a cab positioned forward of the sleeper, the cab having no rear wall adjacent the sleeper;

a sleeper having no front wall adjacent the cab, the cab and sleeper being coupled together such that access between the cab and the sleeper is substantially unrestricted; and a gasket provided between the cab and the sleeper, the cab and the sleeper being bolted together, such that a compression seal is created at an interface between the cab and the sleeper, an adhesive sealant being provided along an exterior surface of the gasket, thereby substantially sealing the interface between the cab and the sleeper against moisture, and wherein a gutter is provided below an interior surface of the gasket along the interface between the cab and the sleeper to catch moisture that may leak past the adhesive seal or the gasket and to channel the moisture away from the interface between the cab and the sleeper.

* * * * *

UNITED STATES PATENT AND TRADEMARK OFFICE
CERTIFICATE OF CORRECTION

PATENT NO.   : 5,560,673
DATED        : October 1, 1996
INVENTOR(S)  : Gerald J. Angelo It is certified that error appears in the above-indentified patent and that said Letters Patent is hereby corrected as shown below:

Title page, item [73] Assignee: delete "inc." and insert--therefor--Inc--.

Signed and Sealed this

Eighth Day of April, 1997

Attest:

BRUCE LEHMAN

Attesting Officer                Commissioner of Patents and Trademarks

UNITED STATES PATENT AND TRADEMARK OFFICE
CERTIFICATE OF CORRECTION

PATENT NO. : 5,560,673
DATED : October 1, 1996
INVENTOR(S) : Gerald J. Angelo

It is certified that error appears in the above-indentified patent and that said Letters Patent is hereby corrected as shown below:

On page 2 of the title page in field [57] denoting the Abstract, in the last sentence please delete "frown" and insert therefor --from--.

Signed and Sealed this

Twenty-ninth Day of April, 1997

*Attest:*

BRUCE LEHMAN

*Attesting Officer*     *Commissioner of Patents and Trademarks*